United States Patent Office 3,277,508
Patented Oct. 11, 1966

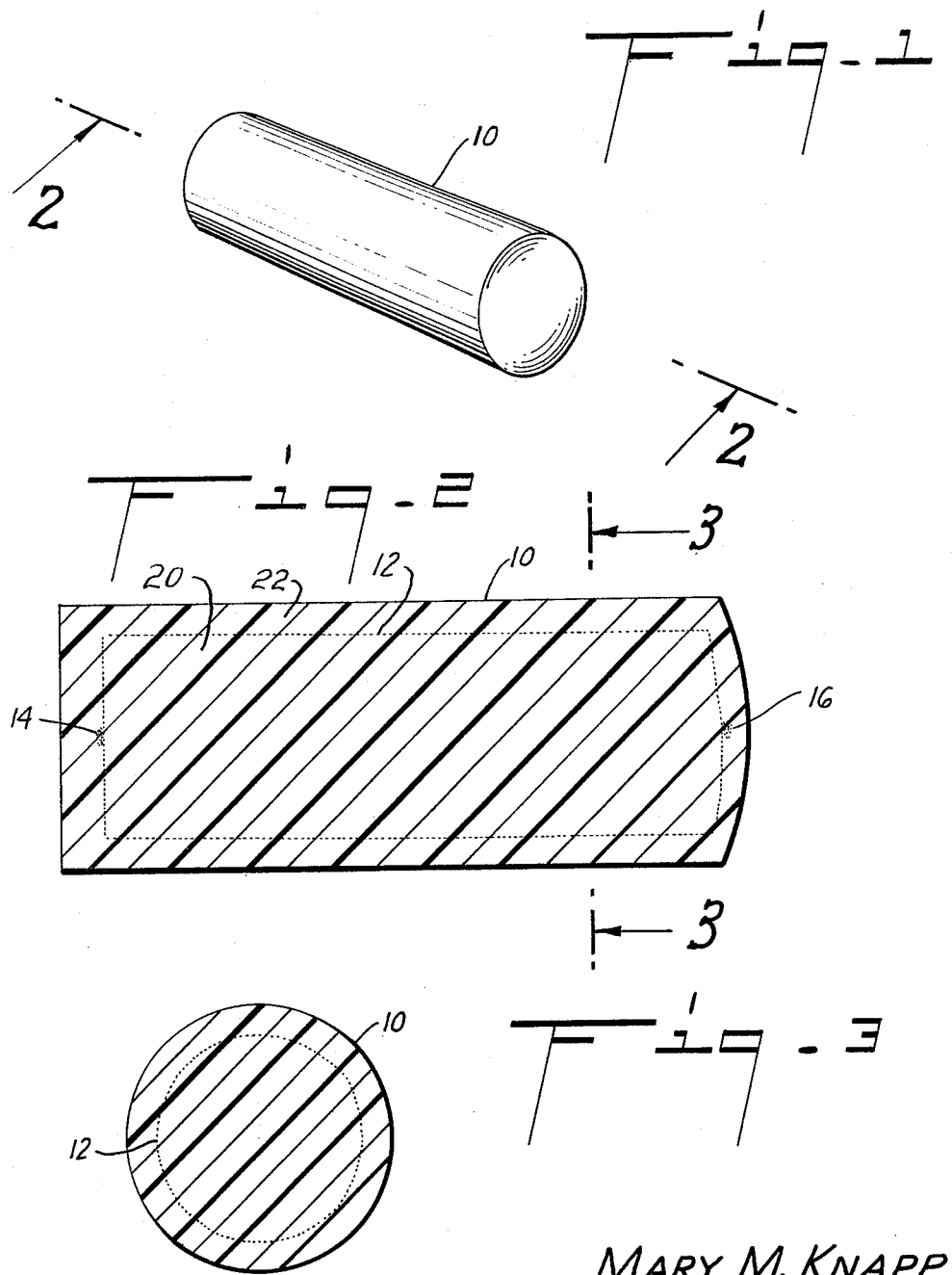

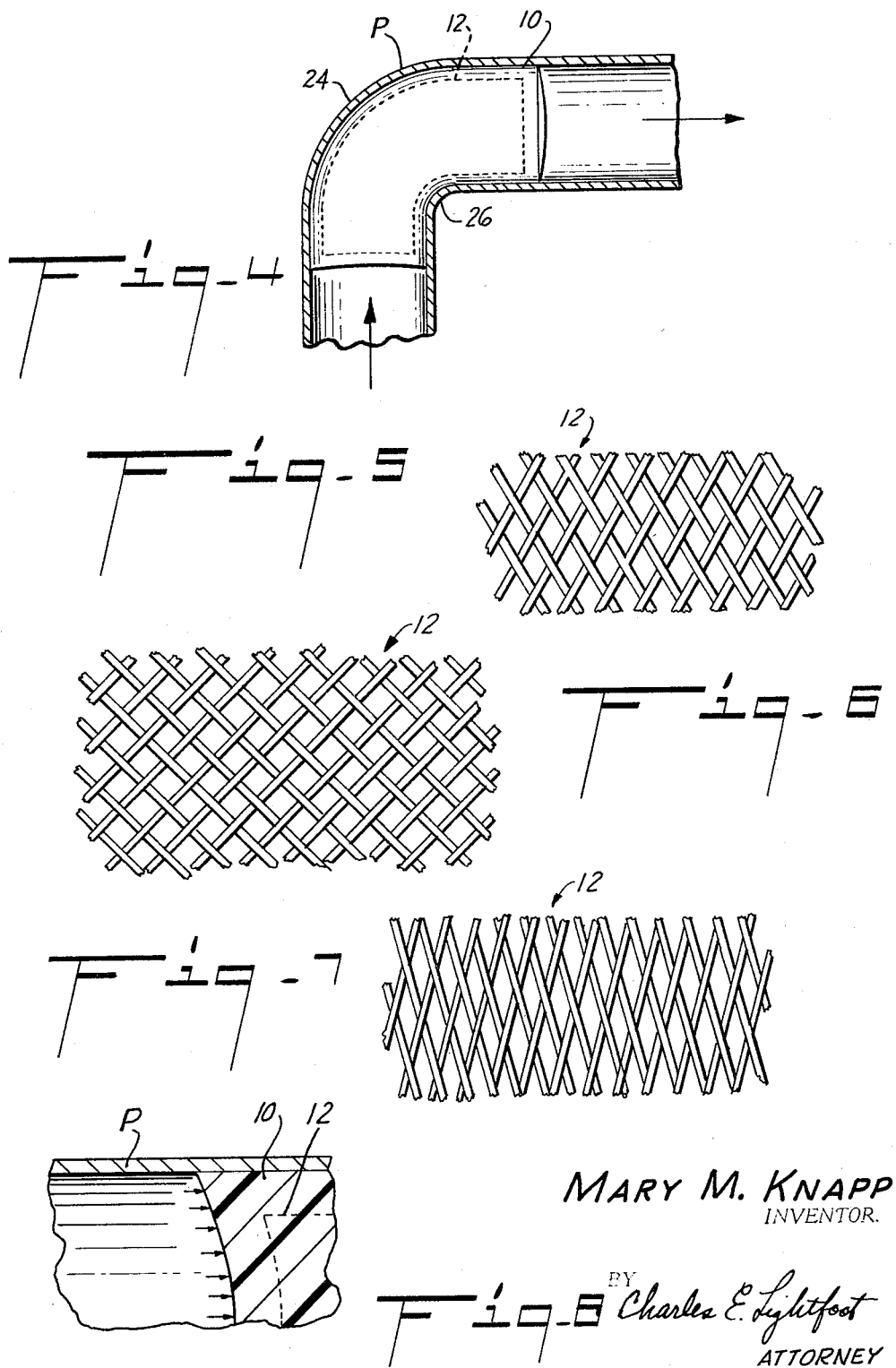

3,277,508
PIPE LINE PLUG OR SWIPE
Mary M. Knapp, 3831 Case St., Houston, Tex.
Filed Oct. 20, 1965, Ser. No. 498,306
8 Claims. (Cl. 15—104.06)

This invention relates to an improved pipe line plug or swipe which is designed to be inserted into a pipe line and propelled therethrough by a pressure gradient to clean the interior of the pipe.

The invention is capable of application in connection with pipe line plugs or swipes which are formed of flexible, resilient material and finds particular utility in connection with plugs or swipes having a spongy or cellular consistency, such as those formed of plastic foam such as foamed polyurethane or the like.

Heretofore in the cleaning of pipe lines use has been made of plugs or swipes formed of resilient, flexible material, such as rubber, foamed plastic, or the like which are propelled through the pipe by means of a pressure gradient, such plugs or swipes possessing the advantage that they may conform in shape to slight irregularities in the pipe and may pass through bends therein. Plugs or swipes of this kind, and particularly those which are of sponge-like or cellular consistency, such as foamed plastics, may be badly damaged by the working and bending of the material when forced through bends or elbows in the pipe. Such plugs or swipes are also sometimes disintegrated by the sudden release of pressure upon emerging from a pipe line in which they have been subjected to a high pressure gradient.

The present invention has for an important object the provision of a pipe line plug or swipe in the form of a body of flexible, resilient material having means for preventing damage thereto due to deformation of the body in passing through bends, elbows or other irregularities in a pipe line.

Another object of the invention is to provide a plug or swipe formed of flexible, resilient material having reenforcing means for preventing breaking, rupturing or other damage thereto resulting from deformation or bending of the same under pressure, but which does not substantially reduce the flexibility of the device or interfere with its capability of conforming to irregularities in the pipe line during its passage therethrough.

A further object of the invention is the provision in a flexible, resilient pipe line plug or swipe or reenforcing means which functions to prevent disintegration of the plug due to the sudden release of pressure upon emergence of the same from a pipe line wherein it is subjected to a high pressure gradient.

A still further object of the invention is the provision in a pipe line plug or swipe formed of resilient, flexible material of reenforcing means therefor comprising a material in the form of a mesh fabric incorporated in the plug in a manner to limit longitudinal and lateral deformation of the material of the plug to prevent damage thereto due to the forcing of the same through bends or other irregularities in a pipe line and to confine and restrain the material against disintegration due to sudden release of the pressure applied thereto.

The above and other obvious advantages of the invention will be apparent from the following detailed description constituting a specification of the same, when considered in conjunction with the annexed drawings, wherein:

FIGURE 1 is a perspective view of a preferred embodiment of the plug or swipe of the invention;

FIGURE 2 is a cross-sectional view, on an enlarged scale, taken along the line 2—2 of FIGURE 1, looking in the direction indicated by the arrows;

FIGURE 3 is a cross-sectional view, taken along the line 3—3 of FIGURE 2, looking in the direction indicated by the arrows;

FIGURE 4 is a fragmentary top plan view, partly in cross-section illustrating a portion of a pipe line having a bend therein and showing a swipe in accordance with the invention in position in the pipe and passing through the bend;

FIGURE 5 is a fragmentary plan view, on an enlarged scale, of a reenforcing type of mesh fabric suitable for use in the invention, showing the same in a relaxed or unstressed condition;

FIGURE 6 is a view similar to that of FIGURE 5, showing the mesh of the reenforcing fabric in a partially longitudinally extended condition, such as is brought about by elongation or bending of the body of the plug or swipe;

FIGURE 7 is a view similar to that of FIGURE 5, showing the mesh of the reenforcing fabric in a partially longitudinally retracted condition such as is brought about by longitudinal compressing or shortening of the body of the plug or swipe; and FIGURE 8 is a fragmentary central cross-sectional view on a greatly enlarged scale, showing a portion of a pipe line and a plug or swipe of the invention therein and illustrating the effect of the pressure gradient on the plug or swipe during the passage of the same through the pipe.

Referring now to the drawings in greater detail, the plug or swipe of the invention comprises a generally cylindrical body 10 formed of suitable resilient, flexible material, such as rubber, plastics, foamed plastic, or the like, and preferably of somewhat larger diameter than the internal diameter of the pipe through which it is to be propelled. The body is preferably formed of a foamed plastic, such as urethane or the like, having a cellular or sponge-like consistency, which renders it very light and strong and capable of withstanding great compressive forces.

The body 10, in the present illustration is provided with a reenforcing fabric 12, in the shape of a cylinder, embedded therein and which takes the form of a mesh fabric formed of plastic or other suitable material preferably having a relatively coarse knitted or braided, stretchable mesh. The body 10 may conveniently be made by molding and the reenforcing fabric may be incorporated therein during the molding operation, the fabric cylinder being embedded beneath the surface of the body. The reenforcing fabric may have the form of an open ended cylinder or may be formed with end portions such as these indicated at 14 and 16 embedded in the end portions of the body.

The fabric mesh may be disposed at any desired distance within the body of the plug and the mesh of the fabric is such as to allow limited longitudinal extension or stretching of the fabric upon stretching of the material of the body and longitudinal retraction or shortening of the fabric upon compression of the body while at the same time reenforcing the same against breakage due to deformation of the body in passing through bends or other irregularities in the pipe under the high pressure gradients customarily employed to propel the plug or swipe through a pipe. The mesh fabric 12 thus defines an inner portion or core 20 confined within the fabric and an outer portion 22 surrounding the fabric.

As best illustrated in FIGURES 5, 6 and 7, the mesh of the fabric 12 is of a character such that the meshes will be elongated longitudinally upon stretching of the body, as shown in FIGURE 6, and contracted or shortened longitudinally upon compression of the body, as shown in FIGURE 7, such elongation of the mesh longitudinally resulting in the exertion of a compressive force circumferentially on the body about the circumference of the fabric cylinder and such longitudinal retracting or shortening of the mesh allowing circumferential expansion of the fabric cylinder.

Moreover, the reenforcing fabric effectively confines the portion of the body enclosed in the mesh against disintegration or disruption due to the release of pressure on the body when the body emerges from the pipe through which it is propelled by a high pressure gradient.

In making use of the plug or swipe of the invention, the body 10 is inserted into a pipe line, the body being compressed into sealing engagement with the internal surface of the pipe and a pressure gradient is established in the pipe at the opposite ends of the body to propel the plug through the pipe. The pressure gradient in the pipe tends to compress the body longitudinally, thus expaning the body laterally into tighter contact with the internal surface of the pipe, and upon such longitudinal compression of the body the mesh of the fabric 12 will be retracted longitudinally allowing the mesh to expand circumferentially with the body. When the plug passes through a bend in the pipe, such as that illustrated in FIGURE 4 the body will tend to stretch or elongate along the outside curvature 24 of the bend while being compressed along the inside curvature 26 thereof, thus elongating the mesh of the fabric 12 along the outside curvature of the body and shortening the same along the inside curvature thereof.

Upon emergence of the plug from the pipe the mesh fabric effectively holds the body against bursting or disintegration due to the sudden release of the pressure thereon.

It will thus be seen that the invention provides a pipe line plug or swipe which is of simple design and rugged construction, which is strong reenforced by means which does not interfere with the forming of a fluid tight seal between the plug and the internal surface of the pipe regardless of bends or other irregularities through which the plug must pass.

The invention is disclosed herein in connection with a certain specific embodiment of the same, which it will be understood is intended by way of illustration only, it being obvious that various modifications can be made in the structure of the plug or swipe as well as the materials of which the same is composed, within the spirit of the invention and the scope of the appended claims.

Having thus clearly shown and described the invention, what is claimed as new and desired to secure by Letters Patent is:

1. In a pipe line plug adapted to be propelled through a pipe by a pressure gradient
   a cylindrical body formed of resilient material, and
   a generally cylindrically shaped reenforcing element formed of mesh fabric embedded in the body in substantially concentric relation therewith.

2. A pipe line plug in accordance with claim 1 wherein the mesh of said fabric is disposed to allow limited stretching of the fabric longitudinally in response to elongation of the body.

3. A pipe line plug in accordance with claim 1 wherein the mesh of said fabric is of a type to allow limited stretching of the fabric in response to elongation and circumferential expansion of the body.

4. In a pipe line plug adapted to be propelled through a pipe by a pressure gradient
   a cylindrical body formed of resilient material,
   a generally cylindrically shaped element formed of mesh fabric embedded in the body and defining an inner cylindrical core portion in and confined by said fabric and an unconfined outer cylindrical portion surrounding said fabric.

5. A pipe plug in accordance with claim 4 wherein the mesh of said fabric is disposed to allow limited stretching of the fabric longitudinally in response to elongation of said body.

6. A pipe plug in accordance with claim 4 wherein the mesh of said fabric is disposed to allow limited stretching of the fabric in response to elongation and circumferential expansion of the body.

7. In a pipe plug adapted to be propelled through a pipe by a pressure gradient
   a cylindrical body formed of resilient material,
   an elongated generally cylindrically shaped reenforcing element formed of fabric having
   an open, stretchable mesh embedded in the body in substantially concentric relation thereto
   said element enclosing an inner core portion of said body and being stretchable longitudinally and circumferentially in response to elongation and circumferential expansion of the body.

8. A pipe plug in accordance with claim 7 wherein said body has an outer cylindrical portion surrounding said reenforcing element.

References Cited by the Examiner
UNITED STATES PATENTS

| | | | |
|---|---|---|---|
| 1,597,850 | 8/1926 | Weis | 15—104.06 |
| 2,906,650 | 9/1959 | Wheaton | 15—104.06 X |
| 3,204,274 | 9/1965 | Knapp | 15—104.06 |

CHARLES A. WILLMUTH, *Primary Examiner.*

E. L. ROBERTS, *Examiner.*